US008874765B2

(12) United States Patent
Kumarasamy et al.

(10) Patent No.: US 8,874,765 B2
(45) Date of Patent: *Oct. 28, 2014

(54) REFRESHING A SESSION INITIATION PROTOCOL (SIP) SESSION

(75) Inventors: Parameswaran Kumarasamy, San Jose, CA (US); Kavithadevi Parameswaran, San Jose, CA (US); Manjunath Bangalore, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 232 days.

This patent is subject to a terminal disclaimer.

(21) Appl. No.: 13/241,779

(22) Filed: Sep. 23, 2011

(65) Prior Publication Data

US 2012/0016998 A1    Jan. 19, 2012

Related U.S. Application Data

(63) Continuation of application No. 11/545,208, filed on Oct. 10, 2006, now Pat. No. 8,036,215.

(51) Int. Cl.
| | | |
|---|---|---|
| *G06F 15/16* | (2006.01) | |
| *H04L 29/06* | (2006.01) | |
| *H04L 29/08* | (2006.01) | |

(52) U.S. Cl.
CPC ......... *H04L 65/1083* (2013.01); *H04L 65/1006* (2013.01); *H04L 67/145* (2013.01); *H04L 67/14* (2013.01)
USPC ....................................................... 709/228

(58) Field of Classification Search
CPC ............ H04L 65/1006; H04L 65/1073; H04L 29/12094; H04L 65/105; H04L 29/125; H04L 61/2564; H04L 29/06; H04L 29/08072; H04L 29/08576; H04L 29/0809; H04L 29/06537

See application file for complete search history.

(56) References Cited

U.S. PATENT DOCUMENTS 6,950,445 B2    9/2005  Svanbro et al.
7,230,930 B2 *  6/2007  Ahya et al. ..................... 370/278
(Continued)

OTHER PUBLICATIONS

Ai-Chun Pang; Chih-Hsiao Liu; Shu Ping Liu; Hui-Nien Hung, "A study on SIP session timer for wireless VoIP," Wireless Communications and Networking Conference, 2005 IEEE , vol. 4, No., pp. 2306,2311 vol. 4, Mar. 13-17, 2005 doi: 10.1109/WCNC.2005.1424875.*

(Continued)

*Primary Examiner* — Andrew Lai
*Assistant Examiner* — Hoyet H Andrews
(74) *Attorney, Agent, or Firm* — Edwards Wildman Palmer LLP; James M. Behmke; Jonathon Western

(57) ABSTRACT

In one embodiment, a session is refreshed using a message that is simplified for refresh purposes. The refresh message that is used is a message used for another purpose in a protocol (e.g., SIP). For example, a reINVITE message may be used as a refresh message. If the reINVITE message is used for its intended purpose, the reINVITE message may be used to change the characteristics of a session. This reINVITE message includes an SDP and full header such that the parameters can be properly changed. However, the reINVITE message may be used to refresh a session. This may be referred to as a simple refresh message. But, the simple refresh message does not include an SDP or any other message body. The simple refresh message includes only a reduced header. This reduces time spent building and parsing the simple refresh message.

22 Claims, 6 Drawing Sheets

(56) References Cited

U.S. PATENT DOCUMENTS

| | | | |
|---|---|---|---|
| 7,822,858 B2 | 10/2010 | Kumarasamy et al. | |
| 8,036,215 B2 * | 10/2011 | Kumarasamy et al. | 370/389 |
| 8,223,748 B2 * | 7/2012 | Bangalore et al. | 370/352 |
| 2003/0128826 A1 | 7/2003 | Benini et al. | |
| 2004/0095938 A1 | 5/2004 | Ryu | |
| 2004/0103282 A1 | 5/2004 | Meier et al. | |
| 2004/0190502 A1 | 9/2004 | Sharma | |
| 2004/0210500 A1 | 10/2004 | Sobel et al. | |
| 2004/0246991 A1 | 12/2004 | Tsuzuki et al. | |
| 2005/0227685 A1 | 10/2005 | Costa Requena et al. | |
| 2006/0084454 A1 | 4/2006 | Sung et al. | |
| 2006/0089966 A1 | 4/2006 | Stille et al. | |
| 2006/0212589 A1 | 9/2006 | Hayer et al. | |
| 2007/0043876 A1 | 2/2007 | Varga et al. | |
| 2007/0054686 A1 | 3/2007 | Allen et al. | |
| 2007/0253428 A1 | 11/2007 | Kumarasamy et al. | |
| 2007/0294345 A1 | 12/2007 | Bangalore et al. | |
| 2008/0086566 A1 | 4/2008 | Kumarasamy et al. | |

OTHER PUBLICATIONS

Rosenberg et al., Session Initiation Protocol (SIP) Update Method, Network Working Group, Request for Comments: 3311, dated Sep. 2002.*

S. Donovan and J. Rosenberg, "Session Timers in the Session Initiation Protocol (SIP)", Networking Group, Request for Comments: 4028, dated Apr. 2005.*

J. Rosenberg and H. Schulzrinne, "Guidelines for Authors of Extensions to the Session Initiation Protocol (SIP) draft-ietf-sip-guidelines-09", SIP Internet-Draft, dated Feb. 16, 2005.*

J. Rosenberg and H. Schulzrinne, "Guidelines for Authors of Extensions to the Session Initiation Protocol (SIP) draft-ietf-sip-guidelines-08", SIP Internet-Draft, dated Jul. 18, 2004.*

M. Garcia-Martin, C. Bormann, J. Ott, R. Price, A. B. Roach, "The Session Initiation Protocol (SIP) and Session Description Protocol (SDP) Static Dictionary for Signaling Compression (SigComp)", Network Working Group, Request for Comments: 3485, dated Feb. 2003.*

Khlifi, H.; Gregoire, J.; Phillips, J., "VoIP and NAT/firewalls: issues, traversal techniques, and a real-world solution," Communications Magazine, IEEE, vol. 44, No. 7, pp. 93,99, Jul. 2006, doi: 10.1109/MCOM.2006.1668388.*

D. Willis, B. Hoeneisen, "RFC 3327",Title, Session Initiation Protocol (SIP) Extension Header Field for Registering Non-Adjacent Contacts, Dec. 2002, Proposed Standard.*

Non-final Office Action mailed Jan. 17, 2012 in U.S. Appl. No. 11/453,443, 43 pages.

Donovan, et al., "Session Timers in the Session Initiation Protocol (SIP)", Network Working Group, Apr. 2005, 27 pages.

Non-final Office Action mailed Jun. 28, 2010 in U.S. Appl. No. 11/453,443, 20 pages.

Final Office Action mailed Nov. 26, 2010 in U.S. Appl. No. 11/453,443, 12 pages.

Notice of Allowance mailed Jun. 28, 2010 in U.S. Appl. No. 11/411,367, 10 pages.

Non-final Office Action mailed Feb. 27, 2009 in U.S. Appl. No. 11/545,208, 22 pages.

Non-final Office Action mailed Apr. 5, 2010 in U.S. Appl. No. 11/545,208, 15 pages.

Final Office Action mailed Sep. 10, 2010 in U.S. Appl. No. 11/545,208, 16 pages.

Final Office Action mailed Oct. 21, 2009 in U.S. Appl. No. 11/545,208, 23 pages.

Notice of Allowance mailed Feb. 24, 2011 in U.S. Appl. No. 11/545,208, 8 pages.

Supplementary European Search Report issued Jul. 15, 2013 from European Application No. EP 07 79 5830, 10 pages.

Niemi, A., et al., "Session Initiation Protocol (SIP) Extension for Event State Publication; draft-ietf-sip-publish-02.txt", Jan. 5, 2004, 39 pages.

Rosenberg, J., et al., "SIP: Session Initiation Protocol", Jun. 1, 2002, 270 pages.

* cited by examiner

INVITE sip:bob@biloxi.example.com SIP/2.0
Via: SIP/2.0/UDP pc33.atlanta.example.com;branch=z9hG4bKnas
302 — Supported: timer, replaces, simple-refresh — 304
Max-Forwards: 70
To: Bob <sip:bob@biloxi.example.com>
From: Alice <sip:alice@atlanta.example.com>;tag=1928301774
Call-ID: a84b4c76e66710
CSeq: 314159 INVITE
Contact: <sip:alice@pc33.atlanta.example.com>
Content-Type: application/sdp 306 {
v=0
o=CiscoSystemsSIP-GW-UserAgent 5140 9698 IN IP4 1.7.56.76
s=SIP Call
t=0 0
m=audio 17012 RTP/AVP 0 8 18 9 4 15 101
c=IN IP4 1.7.56.76
a=rtpmap:0 PCMU/8000
a=fmtp:0 annexb=no
a=rtpmap:8 PCMA/8000
a=fmtp:8 annexb=no
a=rtpmap:18 G729/8000
a=fmtp:18 annexb=yes
a=rtpmap:9 G722/8000
a=fmtp:9 annexb=no
a=rtpmap:4 G723/8000
a=fmtp:4 annexb=no
a=rtpmap:15 G728/8000
a=fmtp:15 annexb=no
a=rtpmap:101 telephone-event/8000
a=fmtp:101 0-16
}

*Fig. 3A*

```
                SIP/2.0 200 OK
                Via: SIP/2.0/UDP pc33.atlanta.example.com;branch=z9hG4bKnas
        308 ⌒Supported: replaces, simple-refresh ⌒ 310
                To: Bob <sip:bob@biloxi.example.com>;tag=9as888nd
                From: Alice <sip:alice@atlanta.example.com>;tag=1928301774
                Call-ID: a84b4c76e66710
                CSeq: 314159 INVITE
                Contact: <sip:bob@192.0.2.4>
                Content-Type: application/sdp ⎛ v=0
              ⎜ o=CiscoSystemsSIP-GW-UserAgent 5140 9698 IN IP4 1.7.56.77
              ⎜ s=SIP Call
              ⎜ t=0 0
         312 ⎨ m=audio 17014 RTP/AVP 0 101
              ⎜ c=IN IP4 1.7.56.77
              ⎜ a=rtpmap:0 PCMU/8000
              ⎜ a=rtpmap:101 telephone-event/8000
              ⎝ a=fmtp:101 0-16
```

*Fig. 3B*

INVITE sip:bob@biloxi.example.com SIP/2.0
Via: SIP/2.0/UDP pc33.atlanta.example.com;branch=z9hG4bKnas
Supported: timer, replaces, simple-refresh
To: Bob <sip:bob@biloxi.example.com>
From: Alice <sip:alice@atlanta.example.com>;tag=1928301774
504 — Call-ID: a84b4c76e66710
CSeq: 314159 INVITE (NO SDP)

*Fig. 5A*

SIP/2.0 200 OK
Via: SIP/2.0/UDP pc33.atlanta.example.com;branch=z9hG4bKnas
Supported: replaces, simple-refresh — 502
To: Bob <sip:bob@biloxi.example.com>;tag=9as888nd
From: Alice <sip:alice@atlanta.example.com>;tag=1928301774
504 — Call-ID: a84b4c76e66710
CSeq: 314159 INVITE (NO SDP)

*Fig. 5B*

SIP/2.0 481 Call/transaction does not exist
Via: SIP/2.0/UDP pc33.atlanta.example.com;branch=z9hG4bKnas
Supported: replaces, simple-refresh — 502
To: Bob <sip:bob@biloxi.example.com>;tag=9as888nd
From: Alice <sip:alice@atlanta.example.com>;tag=1928301774
504 — Call-ID: a84b4c76e66710
CSeq: 314159 INVITE (NO SDP)

*Fig. 5C*

REFRESHING A SESSION INITIATION PROTOCOL (SIP) SESSION

CROSS-REFERENCE TO RELATED APPLICATIONS

This application is a continuation application of and claims priority to U.S. application Ser. No. 11/545,208, filed on Oct. 10, 2006, the contents of which are incorporated herein by reference.

TECHNICAL FIELD

Embodiments of the present invention generally relate to telecommunications and more specifically to techniques for providing a simplified refresh using existing SIP messages in a SIP network.

BACKGROUND

Voice-over Internet Protocol (VoIP) has become popular and prevalent for communications. When a communication between two peers occurs, a session is created for the communication. As VoIP networks evolve into large end-to-end networks, messages, such as session initiation protocol (SIP) messages, increasingly have to traverse a larger number of intermediate hops before reaching a final end point. With unpredictable IP network delays and packet loss, the chances of losing a SIP message are high. This occurs especially if user datagram protocol (UDP) or any other unreliable protocol is used to send messages. When a SIP message is lost, this may lead to a hanging SIP session. A hanging SIP session is a session on one side of the communication that a peer thinks is active but is not active on the other side.

To address the issue of hanging SIP sessions, session refresh mechanisms are used. A SIP session is refreshed by sending SIP messages periodically. Refreshes in SIP can be expensive particularly if there is no change to a session. SIP sessions may be refreshed by sending messages typically used in a dialog, such as UPDATE, reINVITE, OPTIONS/200 OK, etc. These in-dialog messages are sent as a ping to see if the session is still active. If a response is received, then it is assumed the session is active. These messages are typically bulky in that they include a full header and body (e.g. session description protocol (SDP) or extensible markup language (XML) information). This is because they were not designed for a refresh. Rather, they were originally designed to perform other functions and thus, the format and requirements for content to be included in the messages do not take into account a mechanism for a pure refresh. For example, an INVITE message is typically used to request a connection to a device. However, the reINVITE message may be used to refresh a session in that the reINVITE message is sent for a session and if a response is received for the reINVITE message, such as a 200 OK message, it is assumed the session is active. SIP requires that the reINVITE message include certain fields in the header and also an SDP.

BRIEF DESCRIPTION OF THE DRAWINGS

FIG. 3A illustrates an example INVITE message.
FIG. 3B illustrates an example 200 OK message.
FIG. 5A illustrates an example simple refresh message.
FIG. 5B illustrates an example response message.
FIG. 5C illustrates another example response message.

DESCRIPTION OF EXAMPLE EMBODIMENTS

Particular embodiments of the present invention provide techniques for refreshing a session. A session is refreshed using a message that is simplified for refresh purposes. The refresh message that is used is a message used for another purpose in a protocol (e.g., SIP). For example, a reINVITE message may be used as a refresh message. If the reINVITE message is used for its intended purpose, the reINVITE message may be used to change the characteristics of a session. This reINVITE message includes an SDP and full header such that the parameters can be properly changed. However, the reINVITE message may be used to refresh a session. This may be referred to as a simple refresh message. But, the simple refresh message does not include an SDP or any other message body. The simple refresh message includes only a reduced header. This reduces time spent building and parsing the simple refresh message. Also, less bandwidth is used in sending the simple refresh messages.

A negotiation between a refresher and refreshee occurs to determine if each supports the simple refresh method. A refresher may be any entity that initiates a refresh. For example, the refresher may send a message to another entity for a refresh to be performed. The refreshee is any entity that can perform a refresh. The refresh may be determining if a session is active or not. For example, the refreshee receives the refresh request and can determine if a session is active or not.

If the simple refresh method is supported, then a refresher generates a refresh message for a session. The refresh message may not include an SDP and includes only a reduced header. For example, the header may include only mandatory fields. The refresh message is sent to the refreshee, which can then determine if the session is active. The refreshee then sends a response message indicating whether the session is active or not. The response message may not include an SDP either and includes only a reduced header.

Figure 1:
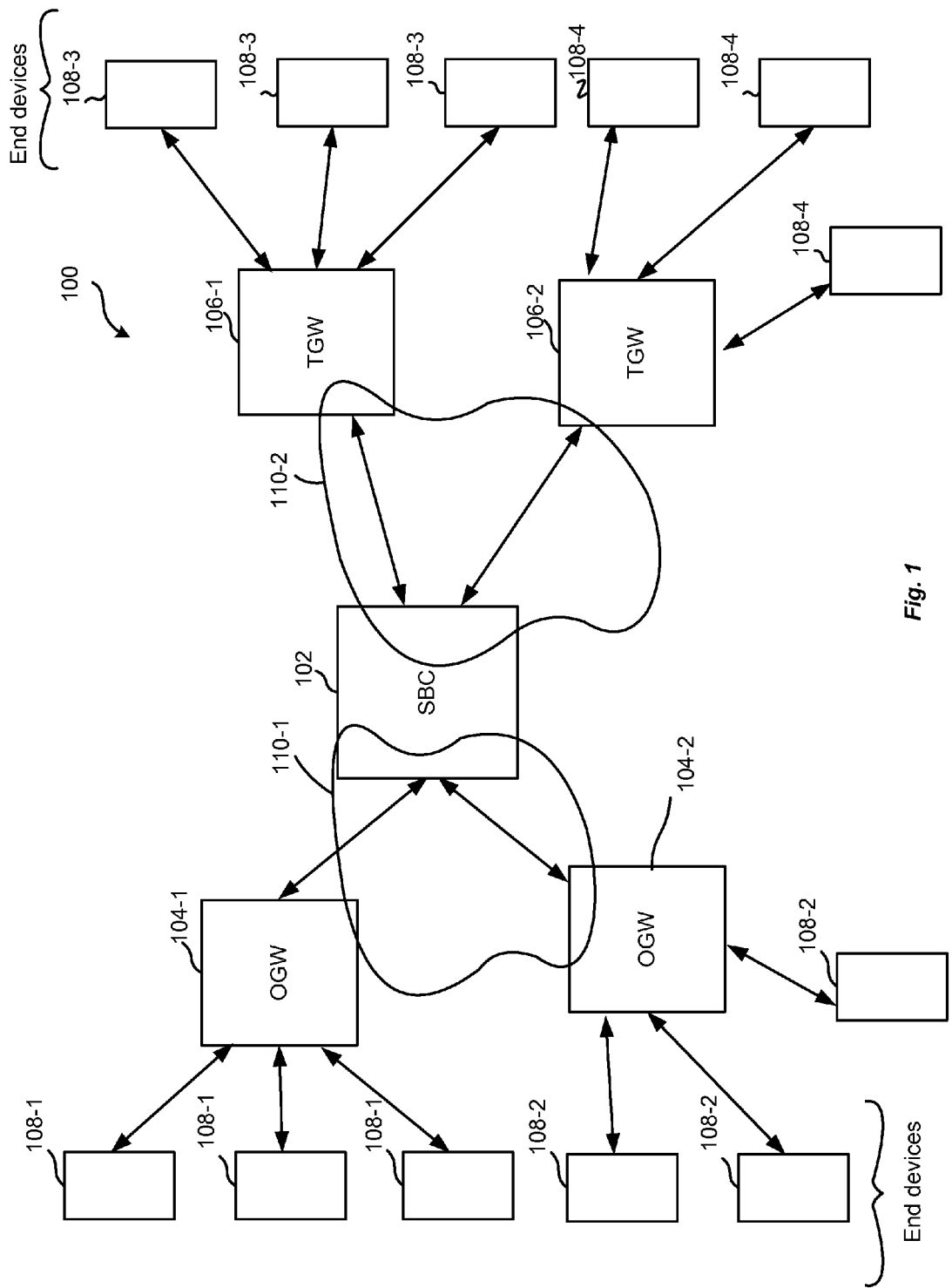
FIG. 1 illustrates an example system for refreshing a SIP session.

FIG. 1 illustrates an example system for refreshing a SIP session. As shown, a session border controller (SBC) 102, originating gateway (OGW) 104, terminating gateway (TGW) 106, end devices 108, and networks 110 are provided. Communications may be routed between end devices 108. A session is created for the communications that are routed between originating gateway 104 and terminating gateway 106 for end device 108-1 and end device 108-2. Many sessions may be created by different end devices 108-1 and 108-2. Session Border Controller 102 keeps track of which sessions are established between originating gateways 104 and terminating gateways 106.

End devices 108 may be any devices that can participate in a communication. For example, end devices may be IP telephones, public switch telephone network (PSTN) devices, computers, instant message clients, soft phones, or any other devices that can participate in a communication.

Originating gateway 104 may be any network device configured to manage communications with end devices 108-1. Originating gateway 104 may be the gateway that originates a communication. As shown, multiple originating gateways 104 may be included in system 100. Each originating gateway 104 may be associated with different sets of end devices 108. For example, gateway 104-1 manages a set of end devices 108-1.

Terminating gateway 106 may be any network device configured to manage communications with end devices 108-2. Terminating gateway 106 may be the gateway that receives a communication from originating gateway 104. Terminating gateway 106 may then send a communication to an end device 108-2. As shown, multiple terminating gateways 106 may be included in system 100. For example, terminating gateway 106-1 may be associated with a set of end devices 108-3.

Although originating gateway 104 and terminating gateway 106 are referred to as "originating" and "terminating", it will be understood that communications may be flow in both directions. Thus, originating gateway 104 and terminating gateway 106 may originate and terminate communications.

Session border controller 102 is a network device configured to sit in between communications between originating gateway 104 and terminating gateway 106. Session border controller 102 keeps track of which set of sessions are established between originating gateway 104 and terminating gateway 106. Session border controller 102 may include IP-to-IP gateways, SIP proxies, IP-PBXs, media gateways, soft switches, Back-To-Back User Agents (B2BUAs), etc.

Networks 110 may be any networks. For example, both network 110-1 and 110-2 may be IP networks. Session initiation protocol (SIP) may be used to send SIP messages between originating gateway 104 and terminating gateway 106. Although SIP is described, it will be understood that other protocols may be appreciated.

Session border controller 102 keeps track of SIP sessions as they are created. The session may be active on both originating gateway 104 and terminating gateway 106. However, at some point, a session at originating gateway 104 and/or terminating gateway 106 may become inactive on one gateway but not the other. The session may be considered hanging in this case. A hanging session is where one side or both the sides of a communication think that a session is active but the session is inactive on one side or both the sides of the communication. For example, terminating gateway 106 may think that a session is active. However, the session may be inactive on originating gateway 104. The session may become inactive for different reasons. For example, a session may time-out and become inactive after a certain period of time. Signaling and/or media packets that are lost in a communication may cause a time-out.

When hanging sessions occur, actions may be taken to clear the session. For example, a BYE message should be sent by terminating gateway 106 to end the session or the session can be forcibly torn down such that resources used by that session are released and can be used for a new session. This clears the hanging session from terminating gateway 106. Similarly other devices like session border controller 102 and originating gateway 104 can initiate a session clean-up. Before clearing the sessions, however, it is determined which sessions are hanging by using the simple refresh method.

Accordingly, embodiments of the present invention provide a simple refresh message for refreshing sessions. In one embodiment, a negotiation, using, for example, SIP INVITE and 200 OK messages, may be performed to determine if a refreshee and refresher support the simple refresh. In one example, originating gateway 104 may send an INVITE message to session border controller 102 with a tag that indicates the simple refresh is supported. Session border controller 102 sends a 200 OK message back to originating gateway 104 with a tag that indicates it supports the simple refresh, if it does. If it does not, the 200 OK message does not include the tag indicating it does not support simple refresh. Although, INVITE and 200 OK messages are described, it will be recognized that other SIP messages may be used to negotiate support for the simple refresh method, such as message used to create a dialog.

If the simple refresh method is supported, a refresher can then generate a simple refresh message. The simple refresh message is a message that may be used for another purpose other than a refresh. The simple refresh message includes less information if the message was used for a purpose other than a refresh. For example, the simple refresh message does not include a body (e.g., SDP or XML text) and also includes a reduced header. In one example, an INVITE message may be used in a mid-call negotiation. When used mid-call, the INVITE message is referred to as a reINVITE message. The reINVITE message carries media information (SDP) used in an offer and response. The media information is used to represent media characteristics that end devices wish to use for the given session. The SDP is needed to perform the mid-call negotiation but not needed for a refresh. The simple refresh message may be an INVITE message but includes less information, such as no SDP and a reduced header. Thus, in protocol messages are used to perform refreshes.

The simple refresh message is sent to a refreshee. The refreshee determines if the message is for the refresh or for another purpose. Various ways may be used to determine whether the message is for a refresh or another purpose, which will be described in more detail below. When a refreshee receives a simple refresh message, the refreshee can then refresh the session (i.e., determine if the session is active or not). The refreshee then sends a response message to the refresher indicating whether the session is active or not. The response message may be a message used for another purpose. However, the response message includes less information than if the response message is used for another purpose.

Accordingly, the simple refresh cuts down on extra processing because the act of building and parsing the body and header is reduced. Also, bandwidth used is reduced as the size of the message is smaller. Further, the processing time and bandwidth saved is increased as session border controller 102 handles a larger number of calls. Also, when session border controller 102 is connected to multiple gateways 104-1 and 104-2 and 106-1 and 106-2 as shown, then the savings is multiplied by as many gateways 104 and 106 in which session border controller 102 is connected. Also note that session border controller 102 has two instances of a user agent, also called back-to-back UA (B2BUA), for a given call, which means twice the benefits, if the simple refresh is used.

Figure 2:
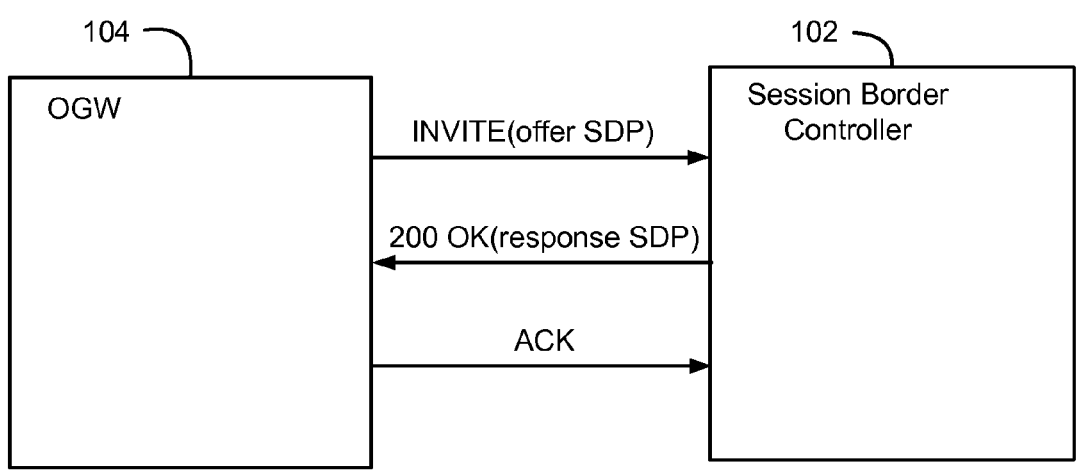
FIG. 2 illustrates an example negotiation to determine support for simple refresh.

FIG. 2 illustrates an example negotiation to determine support for simple refresh. In one embodiment, gateway 104 may be a refresher that initiates the simple refresh and session border controller 102 may be a refreshee that performs the refresh. Although the following will be discussed in the context of gateway 104 and SBC 102, embodiments of the present invention may be used between any two SIP peers. Also, although gateway 104 is described as being the refresher and session border controller 102 is described as being the refreshee, it will be understood that the roles may be reversed. Also, other devices in system 100 may assume the roles of the refresher and refreshee.

As calls are placed between originating gateway 104 and terminating gateway 106 through session border controller 102, each segment of the call can negotiate to see if the simple refresh method is supported. A segment may be between originating gateway 104 and session border controller 102 and between session border controller 102 and terminating gateway 106. This may be performed during the initial session establishment.

In one embodiment, gateway 104 sends a message to session border controller 102 to determine if session border controller 102 supports the simple refresh. In one embodiment, a SIP message may be sent, such as a SIP INVITE message. The SIP INVITE message includes a simple refresh tag in a header field that indicates support for the simple refresh.

FIG. 3A illustrates an example INVITE message. As shown, a Supported header field 302 is provided in an INVITE message 300. Supported header field 302 includes features that are supported by session border controller 102. As shown, a tag 304 indicates that the option "simple-refresh" is supported by session border controller 102. This is in addition to other supported header fields such as timer, replaces etc.

A body 306 is also included with this message as is required in SIP for an INVITE message. 1xx messages may then be exchanged between gateway 104 and SBC 102.

Session border controller 102 may then send a message back to session gateway 104 that indicates whether or not the simple refresh is supported. If the simple refresh is supported, then a tag of "simple-refresh" may be included in a header field in a 200 OK SIP message. An ACK may then be received.

FIG. 3B illustrates an example 200 OK message. As shown, a Supported header field 308 includes a tag 310 of "simple-refresh". Also, Supported header field 308 includes other features that are supported by gateway 104, such as replaces. Further, a body 312 includes an SDP as is required by the SIP protocol for a 200 OK message.

A timer negotiation may also be performed to determine when a refresh will be performed. For example, it will be determined that a refresh for a session is performed every minute. The session timer negotiation may be performed as part of INVITE/200 OK messaging by including the "session-expires" value that is supported by each originating gateway 104 and session border controller 102.

Accordingly, if the simple refresh is supported by both session border control 102 and gateway 104, then a simple refresh may be performed. However, if session border controller 102 does not include the simple-refresh tag in a response, then sessions may be refreshed individually as it is done currently with full messages including a body and full header using messages, such as reINVITE, SUBCRIBE, etc.

Figure 4:
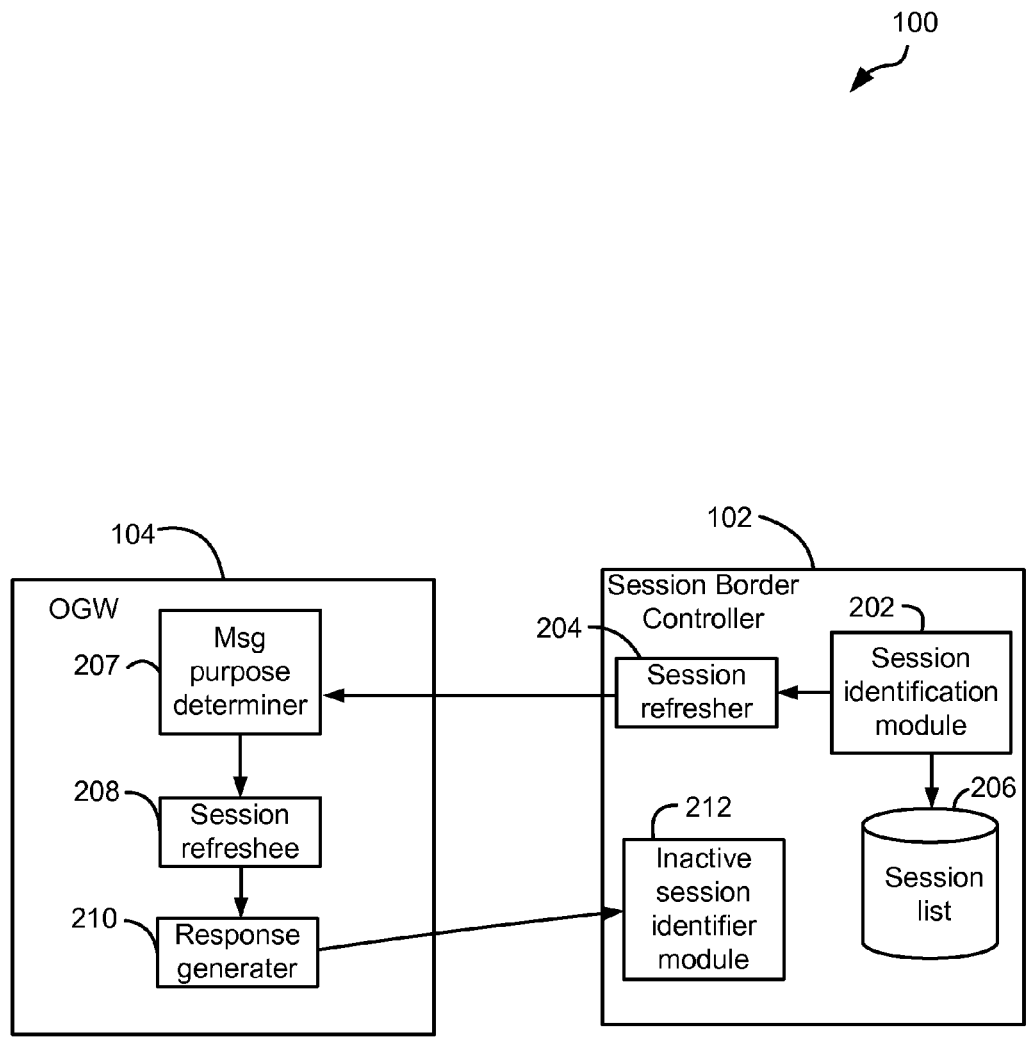
FIG. 4 illustrates an example OGW and an example SBC in the system illustrated in FIG. 1.

FIG. 4 illustrates an example OGW and an example SBC in the system illustrated in FIG. 1. As shown, session border controller 102 and originating gateway 104 are provided. For discussion purposes, the communication is assumed to be between session border controller 102 and originating gateway 104. However, terminating gateway 106 may include the same components as described with respect to originating gateway 104. Also, although originating gateway 104 is shown as initiating the simple refresh, it will be understood that other devices in system 100 may initiate the simple refresh, such as session border controller 102 and terminating gateway 106.

Session border controller 102 includes a session identification module 202, a session refresher 204, and a session list 206. Session identification module 202 is configured to determine sessions that have been created between originating gateway 104 and terminating gateway 106. Session identification module 202 uses session identifiers that are stored in session list 206 when the sessions were created.

In one embodiment, as sessions are created and calls are placed between gateway 104 and session border controller 102 and/or terminating gateway 106, the negotiation as to whether simple refresh is supported may be performed during this messaging. Session refresher 204 may determine if the simple refresh message is supported for a session. If so, session refresher 204 then generates a simple refresh message.

The simple refresh message may not include a body. Also, a reduced header may be provided. The header includes fewer fields than are required in the reINVITE message if it is used for reINVITE purposes. In one embodiment, the header includes a Message field followed by the dialog-identifier headers (Via, Supported, To, From, Call ID, CSeq). This results in a lightweight message that is easy to build/parse and uses very little bandwidth to send.

FIG. 5A illustrates an example simple refresh message. Message 500 is an INVITE message, which may serve as a simple refresh message in this case but also could be used for another purpose.

As shown in a Supported field, a tag 502 of simple-refresh is included. This tag indicates that message 500 is for a simple refresh. Also, a body is not included in message 500.

Other fields are included in the message, such as a Via, Max-Forwards, To, From, Call ID, CSeq, Contact. This is a reduced number of fields. All fields are required if the reINVITE message is used for another purpose other than a refresh.

Because the body does not need to be included in the simple refresh message 500 and a reduced header is provided, less processing time is spent to build message 500. Also, because the SDP is not included and the header fields are reduced, bandwidth is saved in sending message 500 to session refreshee 208.

Referring back for FIG. 4, a message purpose determiner 207 of session border controller 102 may receive the simple refresh message. Message purpose determiner 207 determines what action the message is requesting. For example, the message may be sent for a refresh or may be sent for another purpose other than a refresh. Many methods may be used to determine what the message is requesting. For example, a time interval for refreshing a session may be established during the negotiation. If the message is sent at substantially the time a refresh message is sent, then it may be determined that the message is for a simple refresh. Also, secondary checks may be used to determine the message is for a refresh, such as the message does not include a SDP and includes a reduced header. Also, if an identifier is included in the message, such as a tag 504, then message purpose determiner 207 may determine that the message is for a simple refresh. Other ways of determining the purpose of the message may be appreciated.

If the message is for a simple refresh, session refreshee 208 then performs the session refresh. To perform the refresh, session refreshee 208 does not need to parse a full header or a body. Rather, session refreshee 208 can determine the session identifier (e.g., call ID) and then determine if the session for the identifier is active or not.

A response generator 210 then generates a response message. The response message indicates whether or not the session is active. Response generator 210 may build a response message that does not include a body. Also, only a reduced header may be included. If the session is active, a response may be a 200 OK response message that is sent with only a reduced header and no body. If the session is not active, a 481 Call/Transaction does not exist is sent without a full header and body. Although these messages are described, it will be understood that other messages may be sent that indicate whether the session is active or not.

FIG. 5B illustrates an example response message. This message is a 200 OK message indicating the session is active. As shown, a body is not included. Also, the same header fields are provided in response message 520 as found in simple refresh message 500. In call-ID field 504, the session identifier that was included in message 500 is included. Because the response message 520 does not include an SDP and includes a reduced number of header fields, processing in generating message 520 is saved and bandwidth is conserved in sending message 520 to an inactive session identifier module 212. A tag 502 of "simple-refresh" is included in message 520. This is so the refresher can distinguish this 200 OK message as a response to the refresh message rather than a response to an INVITE message or other SIP message.

Referring back to FIG. 4, inactive session identifier module 212 receives the response from response generator 210. Message 520 is parsed and it is determined if the session is active or not. Message 520 does not include a body so that does not need to be parsed and, in addition, the header is reduced and a large number of fields do not need to be parsed. Accordingly, it can be determined if the session is active or not with a minimal amount of parsing/processing. In one embodiment, when a 200 OK message is received with a tag 502 of simple-refresh, it is assumed the session identified in Call-ID field 504 is active.

If inactive session identifier module 212 determines that a session is inactive, then originating gateway 104 may take actions to clear any discrepancies for inactive sessions. For example, originating gateway 104 may send a BYE message to terminating gateway 106 for the inactive sessions identified. Also, session border controller 102 may send a BYE message for the inactive sessions. Accordingly, terminating gateway 106 is notified and can end the inactive sessions itself.

If the session is not active, a response message may be a failure message, such as a 481 Call/Transaction does not exist FIG. 5C illustrates another example response message.

In one embodiment, when the 481 Call/Transaction does not exist message is received with a tag 502 of simple-refresh, it is assumed the session identified in Call-ID field 504 is inactive.

Other methods of determining that a session is active or inactive may be appreciated. For example, a tag may be included in a message that indicates whether the session is active or not. Thus, two different types of messages do not need to be sent. Also, a response message may not be sent back if the session is not active. Originating gateway 104 may then determine that the session is not active if a response is not received within a certain amount of time.

Also, other messages may be used as simple refresh messages. For example, any in-dialog messages (i.e., any messages used while after a dialog has been established), such as INFO, UPDATE, OPTIONS, etc. may be used.

Although the above is described as sending a simple refresh message for one session, it will be recognized that multiple sessions may be refreshed using the same simple refresh message. For example, multiple session identifiers may be included in the simple refresh message for refreshing. A response that indicates which sessions are active or not may then be received. In one embodiment, further details are described in U.S. patent application Ser. No. 11/411,367, entitled "Techniques for Bulk Refresh of Sessions in IP Networks", filed Apr. 26, 2006, which is incorporated by reference in its entirety for all purposes.

Embodiments of the present invention provide many advantages. For example, an efficient way of refreshing SIP sessions is provided. Less processing is spent building the refresh message. The reduced message size also uses less bandwidth and requires less parsing at the refreshee. Accordingly, resources (CPU/memory) on the SIP network involved in the session refresh are saved thus freeing up devices to handle a larger number of simultaneous calls. Further, there is a direct impact on network bandwidth use due to messages that are smaller. Accordingly, session border controllers 102 may handle more calls with multiple gateways 104 because of the processing and bandwidth that is saved using embodiments of the present invention.

Although the invention has been described with respect to specific embodiments thereof, these embodiments are merely illustrative, and not restrictive of the invention. For example, although SIP is described, it will be recognized that other protocols may be appreciated. Additionally, other devices than those described may use the simple refresh.

Any suitable programming language can be used to implement the routines of embodiments of the present invention including C, C++, Java, assembly language, etc. Different programming techniques can be employed such as procedural or object oriented. The routines can execute on a single processing device or multiple processors. Although the steps, operations, or computations may be presented in a specific order, this order may be changed in different embodiments. In some embodiments, multiple steps shown as sequential in this specification can be performed at the same time. The sequence of operations described herein can be interrupted, suspended, or otherwise controlled by another process, such as an operating system, kernel, etc. The routines can operate in an operating system environment or as stand-alone routines occupying all, or a substantial part, of the system processing. Functions can be performed in hardware, software, or a combination of both. Unless otherwise stated, functions may also be performed manually, in whole or in part.

In the description herein, numerous specific details are provided, such as examples of components and/or methods, to provide a thorough understanding of embodiments of the present invention. One skilled in the relevant art will recognize, however, that an embodiment of the invention can be practiced without one or more of the specific details, or with other apparatus, systems, assemblies, methods, components, materials, parts, and/or the like. In other instances, well-known structures, materials, or operations are not specifically shown or described in detail to avoid obscuring aspects of embodiments of the present invention.

A "computer-readable medium" for purposes of embodiments of the present invention may be any medium that can contain, store, communicate, propagate, or transport the program for use by or in connection with the instruction execution system, apparatus, system or device. The computer readable medium can be, by way of example only but not by limitation, an electronic, magnetic, optical, electromagnetic, infrared, or semiconductor system, apparatus, system, device, propagation medium, or computer memory.

Embodiments of the present invention can be implemented in the form of control logic in software or hardware or a combination of both. The control logic may be stored in an information storage medium, such as a computer-readable medium, as a plurality of instructions adapted to direct an information processing device to perform a set of steps disclosed in embodiments of the present invention. Based on the disclosure and teachings provided herein, a person of ordinary skill in the art will appreciate other ways and/or methods to implement the present invention.

A "processor" or "process" includes any human, hardware and/or software system, mechanism or component that processes data, signals or other information. A processor can include a system with a general-purpose central processing unit, multiple processing units, dedicated circuitry for achieving functionality, or other systems. Processing need not be limited to a geographic location, or have temporal limitations. For example, a processor can perform its functions in "real time," "offline," in a "batch mode," etc. Portions of processing can be performed at different times and at different locations, by different (or the same) processing systems.

Reference throughout this specification to "one embodiment", "an embodiment", or "a specific embodiment" means that a particular feature, structure, or characteristic described in connection with the embodiment is included in at least one embodiment of the present invention and not necessarily in all embodiments. Thus, respective appearances of the phrases "in one embodiment", "in an embodiment", or "in a specific embodiment" in various places throughout this specification are not necessarily referring to the same embodiment. Furthermore, the particular features, structures, or characteristics of any specific embodiment of the present invention may be combined in any suitable manner with one or more other embodiments. It is to be understood that other variations and modifications of the embodiments of the present invention described and illustrated herein are possible in light of the teachings herein and are to be considered as part of the spirit and scope of the present invention.

Embodiments of the invention may be implemented by using a programmed general purpose digital computer, by using application specific integrated circuits, programmable logic devices, field programmable gate arrays, optical, chemical, biological, quantum or nanoengineered systems, components and mechanisms may be used. In general, the functions of embodiments of the present invention can be achieved by any means as is known in the art. Distributed, or networked systems, components and circuits can be used. Communication, or transfer, of data may be wired, wireless, or by any other means.

It will also be appreciated that one or more of the elements depicted in the drawings/figures can also be implemented in a more separated or integrated manner, or even removed or rendered as inoperable in certain cases, as is useful in accordance with a particular application. It is also within the spirit and scope of the present invention to implement a program or code that can be stored in a machine-readable medium to permit a computer to perform any of the methods described above.

Additionally, any signal arrows in the drawings/Figures should be considered only as exemplary, and not limiting, unless otherwise specifically noted. Furthermore, the term "or" as used herein is generally intended to mean "and/or" unless otherwise indicated. Combinations of components or steps will also be considered as being noted, where terminology is foreseen as rendering the ability to separate or combine is unclear.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

The foregoing description of illustrated embodiments of the present invention, including what is described in the Abstract, is not intended to be exhaustive or to limit the invention to the precise forms disclosed herein. While specific embodiments of, and examples for, the invention are described herein for illustrative purposes only, various equivalent modifications are possible within the spirit and scope of the present invention, as those skilled in the relevant art will recognize and appreciate. As indicated, these modifications may be made to the present invention in light of the foregoing description of illustrated embodiments of the present invention and are to be included within the spirit and scope of the present invention.

Thus, while the present invention has been described herein with reference to particular embodiments thereof, a latitude of modification, various changes and substitutions are intended in the foregoing disclosures, and it will be appreciated that in some instances some features of embodiments of the invention will be employed without a corresponding use of other features without departing from the scope and spirit of the invention as set forth. Therefore, many modifications may be made to adapt a particular situation or material to the essential scope and spirit of the present invention. It is intended that the invention not be limited to the particular terms used in following claims and/or to the particular embodiment disclosed as the best mode contemplated for carrying out this invention, but that the invention will include any and all embodiments and equivalents falling within the scope of the appended claims.

We claim:

1. A method comprising:
sending, using a first network device, a negotiation message to a second network device, wherein the negotiation message includes information indicating that a simple-refresh mechanism is supported by the first network device, wherein the simple-refresh mechanism is operable to refresh a Session Initiation Protocol (SIP) session using a first truncated form of an existing SIP message structure with session description protocol fields removed;
responsive to sending the negotiation message, receiving at the first network device a response message from the second network device, wherein the response message (i) includes information indicating whether the simple-refresh mechanism is supported by the second network device and (ii) is in a second truncated form of the existing SIP message structure with the session description protocol fields removed;
examining, using the first network device, the response message to determine whether the response message includes information associated with the simple-refresh mechanism;
identifying, using the first network device, information associated with the simple-refresh mechanism included in the response message; and
based on identifying the information associated with the simple-refresh mechanism included in the response message, determining that the simple-refresh mechanism is supported by the second network device.

2. The method of claim 1, wherein the first network device is selected from the group consisting of an originating gateway for SIP call sessions, and a terminating gateway for SIP call sessions.

3. The method of claim 1, wherein the second network device is a Session Border Controller (SBC) that is configured to handle SIP call sessions.

4. The method of claim 1, wherein the negotiation message is a modified SIP INVITE message, the modification including addition of a "simple-refresh" tag to a "Supported" field in a header of the SIP INVITE message.

5. The method of claim 1, wherein the response message is a modified SIP 200 OK message, the modification including addition of a "simple-refresh" tag to a "Supported" field in a header of the SIP 200 OK message.

6. The method of claim 1, wherein the negotiation message includes information for negotiating a session timer with the second network device, and wherein the response includes information for negotiating the session timer.

7. The method of claim 1, comprising:
based on determining that the simple-refresh mechanism is supported by the second network device, sending, using the first network device, a simple-refresh message to the second network device, wherein the simple-refresh message includes a request to determine whether a SIP call session identified within the simple-refresh message is active or inactive;
responsive to sending the simple-refresh message, receiving, at the first network device, a response message from the second network device;
identifying, using the first network device, type of the response message received; and
based on identifying the type of the response message received, determining, using the first network device, whether the SIP call session is active or inactive.

8. The method of claim 7, wherein the simple-refresh message is a modified SIP reINVITE message, the modification including addition of a "simple-refresh" tag to a "Supported" field in a header of the SIP reINVITE message and removal of a body from the SIP reINVITE message.

9. The method of claim 7, wherein identifying the type of the response message received further includes:
identifying, using the first network device, that the response message received is a SIP 200 OK message; and
based on identifying that the SIP 200 OK message received, determining, using the first network device, that the SIP call session is active.

10. The method of claim 9, wherein the response message is a modified SIP 200 OK message, the modification including addition of a "simple-refresh" tag to a "Supported" field in a header of the SIP 200 OK message, wherein the header also includes information associated with the SIP call session identified in the simple-refresh, the modification including removal of a body from the SIP 200 OK message.

11. The method of claim 7, wherein identifying the type of the response message received further includes:
identifying, using the first network device, that the response message received is a SIP 481 Call/Transaction does not exist message; and
based on identifying that the SIP 481 Call/Transaction does not exist message received, determining, using the first network device, that the SIP call session is inactive.

12. The method of claim 11, wherein the response message is a modified SIP 481 Call/Transaction does not exist message, the modification including addition of a "simple-refresh" tag to a "Supported" field in a header of the SIP 481 Call/Transaction does not exist message, wherein the header also includes information associated with the SIP call session identified in the simple-refresh message, the modification including removal of a body from the SIP 481 Call/Transaction does not exist message.

13. The method of claim 11, comprising:
responsive to determining that the SIP call session is inactive, sending a SIP BYE message to a terminating gateway, wherein the SIP BYE message is associated with the SIP call session.

14. An apparatus comprising:
at least one processor;
a list of call sessions encoded in a storage medium;
a session identification module including instructions encoded in a non-transitory machine-readable medium for execution by the at least one processor and operable to cause the at least one processor to perform functions including:
examining the list of call sessions for extracting session identifiers associated with call sessions included in the list; and
based upon extracting the session identifiers, determining call sessions that are established between an originating gateway and a terminating gateway;
a session refresher unit including instructions encoded in a non-transitory machine-readable medium for execution by the at least one processor and operable to cause the at least one processor to perform functions including:
determining, during establishment of a call session between an originating gateway and a terminating gateway through a session border controller, whether a simple-refresh mechanism is supported for the call session, wherein the simple-refresh mechanism is operable to refresh a Session Initiation Protocol (SIP) session using a first truncated form of an existing SIP message structure with session description protocol fields removed; and
based upon determining that the simple-refresh mechanism is supported for the call session, generating a simple-refresh message; and
an inactive session identifier module including instructions encoded in a non-transitory machine-readable medium for execution by the at least one processor and operable to cause the at least one processor to perform functions including:
based upon sending the simple-refresh message from the session refresher unit to a session border controller for the call session, receiving a response message from the session border controller, wherein the response message is in a second truncated form of the existing SIP message structure with the session description protocol fields removed;
examining the response message; and
based upon examining the response message, determining whether the session is active or inactive.

15. The apparatus of claim 14, wherein determining whether a simple-refresh mechanism is supported for the call session comprises sending a negotiation message, the negotiation message being a modified SIP INVITE message, the modification including addition of a "simple-refresh" tag to a "Supported" field in a header of the SIP INVITE message.

16. The apparatus of claim 14, wherein the simple-refresh message is a modified SIP reINVITE message, the modification including addition of a "simple-refresh" tag to a "Supported" field in a header of the SIP reINVITE message and removal of a body from the SIP reINVITE message.

17. An apparatus comprising:
a message purpose determiner unit including instructions encoded in a non-transitory machine-readable medium for execution by at least one processor and operable to cause the at least one processor to perform functions including:
receiving, from a gateway node, a simple-refresh message, wherein the simple-refresh message includes a first truncated form of an existing Session Initiation Protocol (SIP) message structure that is configured to refresh a SIP session and that has session description protocol fields removed;
examining the simple-refresh message;

based upon examining the simple-refresh message, determining an action that is being requested using information included in the simple-refresh message; and based upon determining that the action being requested is a simple-refresh of a call session, forwarding the simple-refresh message to a session refreshee unit;

the session refreshee unit including instructions encoded in a non-transitory machine-readable medium for execution by at least one processor and operable to cause the at least one processor to perform functions including:
receiving the simple-refresh message from the message purpose determiner unit;
examining the simple-refresh message;
based upon examining the simple-refresh message, extracting a session identifier for the call session; and
using the session identifier for the call session, determining whether the call session is active or inactive; and a response generator unit including instructions encoded in a non-transitory machine-readable medium for execution by at least one processor and operable to cause the at least one processor to perform functions including:
receiving information from the session refreshee unit associated with the call session, wherein the information indicates whether the call session is active or inactive;
generating a response message including information indicating whether the call session is active or inactive, wherein the response message is in a second truncated form of the existing SIP message structure with the session description protocol fields removed; and
sending the response message to the gateway node.

18. The apparatus of claim 17, wherein generating the response message further comprises:
based upon receiving information indicating that the call session is active, generating a modified SIP 200 OK message, the modification including addition of a "simple-refresh" tag to a "Supported" field in a header of the SIP 200 OK message, wherein the header also includes information associated with the call session identified in the simple-refresh message, the modification including removal of a body from the SIP 200 OK message; and
based upon receiving information indicating that the call session is inactive, generating a modified SIP 481 Call/Transaction does not exist message, the modification including addition of a "simple-refresh" tag to a "Supported" field in a header of the SIP 481 Call/Transaction does not exist message, wherein the header also includes information associated with the call session identified in the simple-refresh message, the modification including removal of a body from the SIP 481 Call/Transaction does not exist message.

19. A method comprising:
receiving, at a second network device and from a first network device, a simple-refresh message, wherein the simple-refresh message includes a first truncated form of an existing Session Initiation Protocol (SIP) message structure that is configured to refresh a SIP session and that has session description protocol fields removed;
examining, using the second network device, the simple-refresh message;
based upon examining the simple-refresh message, determining, using the second network device, that a simple-refresh of a call session is being requested using information included in the simple-refresh message;
extracting, using the second network device, a session identifier for the call session from the simple-refresh message;
using the session identifier for the call session, determining, using the second network device, whether the call session is active or inactive;
generating, using the second network device, a response message including information indicating whether the call session is active or inactive, wherein the response message is in a second truncated form of the existing SIP message structure with the session description protocol fields removed; and
sending, using the second network device, the response message to the first network device.

20. The method of claim 19, wherein generating the response message comprises one of:
generating a modified SIP 200 OK message, the modification including addition of a "simple-refresh" tag to a "Supported" field in a header of the SIP 200 OK message and removal of a body from the SIP 200 OK message, wherein the header also includes information associated with the call session identified in the simple-refresh message, or
generating a modified SIP 481 Call/Transaction does not exist message, the modification including addition of a "simple-refresh" tag to a "Supported" field in a header of the SIP 481 Call/Transaction does not exist message and removal of a body from the SIP 481 Call/Transaction does not exist message, wherein the header also includes information associated with the call session identified in the simple-refresh message.

21. A system comprising:
a first network device including instructions encoded in a non-transitory machine-readable medium for execution by at least one processor and operable to cause the at least one processor to perform functions including:
sending a negotiation message to a second network device, wherein the negotiation message includes information indicating that a simple-refresh mechanism is supported by the first network device, wherein the simple-refresh mechanism is operable to refresh a Session Initiation Protocol (SIP) session using a first truncated form of an existing SIP message structure and that has session description protocol fields removed;
responsive to sending the negotiation message, receiving a response message from the second network device, wherein the response message includes information indicating whether the simple-refresh mechanism is supported by the second network device;
examining the response message to determine whether the response message includes information associated with the simple-refresh mechanism;
identifying information associated with the simple-refresh mechanism included in the response message; and
based on identifying information associated with the simple-refresh mechanism included in the response message, determining that the simple-refresh mechanism is supported by the second network device; and
the second network device including instructions encoded in a non-transitory machine-readable medium for execution by at least one processor and operable to cause the at least one processor to perform functions including:
receiving, from the first network device, a simple-refresh message, wherein the simple-refresh message includes a truncated form of an existing Session Initiation Protocol (SIP) message structure that is configured to refresh a SIP session;

examining the simple-refresh message;

based upon examining the simple-refresh message, determining that a simple-refresh of a call session is being requested using information included in the simple-refresh message;

extracting a session identifier for the call session from the simple-refresh message;

using the session identifier for the call session, determining whether the call session is active or inactive;

generating a response message including information indicating whether the call session is active or inactive, wherein the response message is in a second truncated form of the existing SIP message structure with the session description protocol fields removed; and sending the response message to the first network device.

22. The system of claim 21, wherein at least one of the negotiation message or the response message is a modified SIP protocol message, the modification including addition of a "simple-refresh" tag to a "Supported" field in a header of the modified SIP protocol message.

* * * * *